US012502758B1

(12) United States Patent
Lin et al.

(10) Patent No.: US 12,502,758 B1
(45) Date of Patent: Dec. 23, 2025

(54) HAMMER TACKER

(71) Applicant: APEX MFG. CO., LTD., Taichung (TW)

(72) Inventors: Chih-Yung Lin, Taichung (TW); Chih-Wei Hu, Taichung (TW)

(73) Assignee: APEX MFG. CO., LTD., Taichung (TW)

( * ) Notice: Subject to any disclaimer, the term of this patent is extended or adjusted under 35 U.S.C. 154(b) by 0 days.

(21) Appl. No.: 19/078,628

(22) Filed: Mar. 13, 2025

(30) Foreign Application Priority Data

Feb. 20, 2025 (TW) ................................ 114106255

(51) Int. Cl.
*B25C 5/11* (2006.01)

(52) U.S. Cl.
CPC .................................... *B25C 5/11* (2013.01)

(58) Field of Classification Search
None
See application file for complete search history.

(56) References Cited

U.S. PATENT DOCUMENTS

2021/0178565 A1* 6/2021 Hu ........................ B25C 5/1617

FOREIGN PATENT DOCUMENTS

TW 1593521 B * 8/2017

* cited by examiner

*Primary Examiner* — Tanzim Imam
(74) *Attorney, Agent, or Firm* — MUNCY, GEISSLER, OLDS & LOWE, P.C.

(57) ABSTRACT

A hammer tacker is provided, wherein the hammer tacker includes: a main body including a hammer head portion and a handle portion located at opposite ends, the hammer head portion including a nail outlet; and a striking mechanism received within the hammer head portion and including a cartridge and a striker, the cartridge being movable toward the nail outlet to strike a staple out from the cartridge; wherein the hammer tacker further includes metal and non-metal parts, the main body is a plastic shell, the main body has an overall length, a distance between a center of gravity of the hammer tacker and the nail outlet in a longitudinal direction of the main body is defined as a gravity center distance, and a first ratio of the gravity center distance to the overall length ranges from 0.237 to 0.292.

10 Claims, 5 Drawing Sheets

HAMMER TACKER

BACKGROUND OF THE INVENTION

Field of the Invention

The present invention relates to a nailing device, particularly to a hammer tacker.

Description of the Prior Art

Generally speaking, a hammer tacker includes two shell members and a striking mechanism received therein, wherein the two shell members typically is formed of metal material or non-metal material. The shell member made of metal material is formed by methods such as impact or punching, which limits the shape of the shell due to the difficulty in processing metal sheets. As a result, the striking mechanism must be positioned using additional fasteners, and the metal shell is heavier, adding to the burden during use. On the other hand, the shell member made of non-metal material (e.g., plastic or composite fibers) can be formed using a mold, making it easy to manufacture with fewer shape restrictions. However, the lighter non-metal shell significantly changes the center of gravity and counterweight structure of the hammer tacker, and if the center of gravity is too far forward or backward, the grip will be unbalanced, uncomfortable, and strenuous, resulting in poor striking action and efficiency.

The present invention is, therefore, arisen to obviate or at least mitigate the above-mentioned disadvantages.

SUMMARY OF THE INVENTION

The main object of the present invention is to provide a hammer tacker which provides a comfortable, labor-saving, and balanced grip, while providing a good and efficient striking action.

To achieve the above and other objects, a hammer tacker is provided, wherein the hammer tacker includes: a main body including a hammer head portion and a handle portion located at opposite ends, the hammer head portion including a nail outlet; and a striking mechanism received within the hammer head portion and including a cartridge and a striker, the cartridge being movable toward the nail outlet to strike a staple out from the cartridge; wherein the hammer tacker further includes metal and non-metal parts, the main body is a plastic shell, the main body has an overall length, a distance between a center of gravity of the hammer tacker and the nail outlet in a longitudinal direction of the main body is defined as a gravity center distance, and a first ratio of the gravity center distance to the overall length ranges from 0.237 to 0.292.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
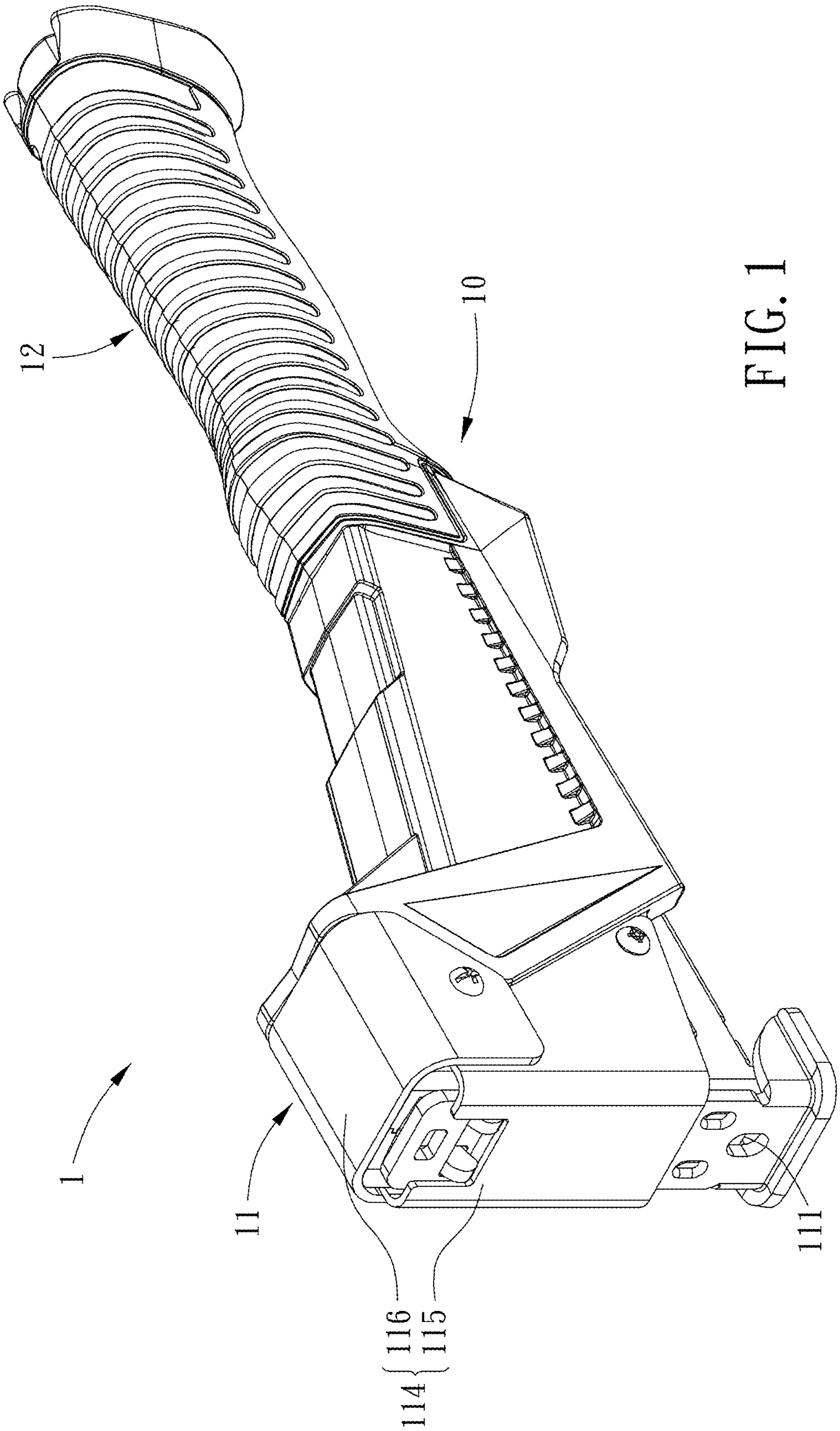
FIG. 1 is a perspective view of an exemplary embodiment of the hammer tacker of the present invention.
Figure 2:
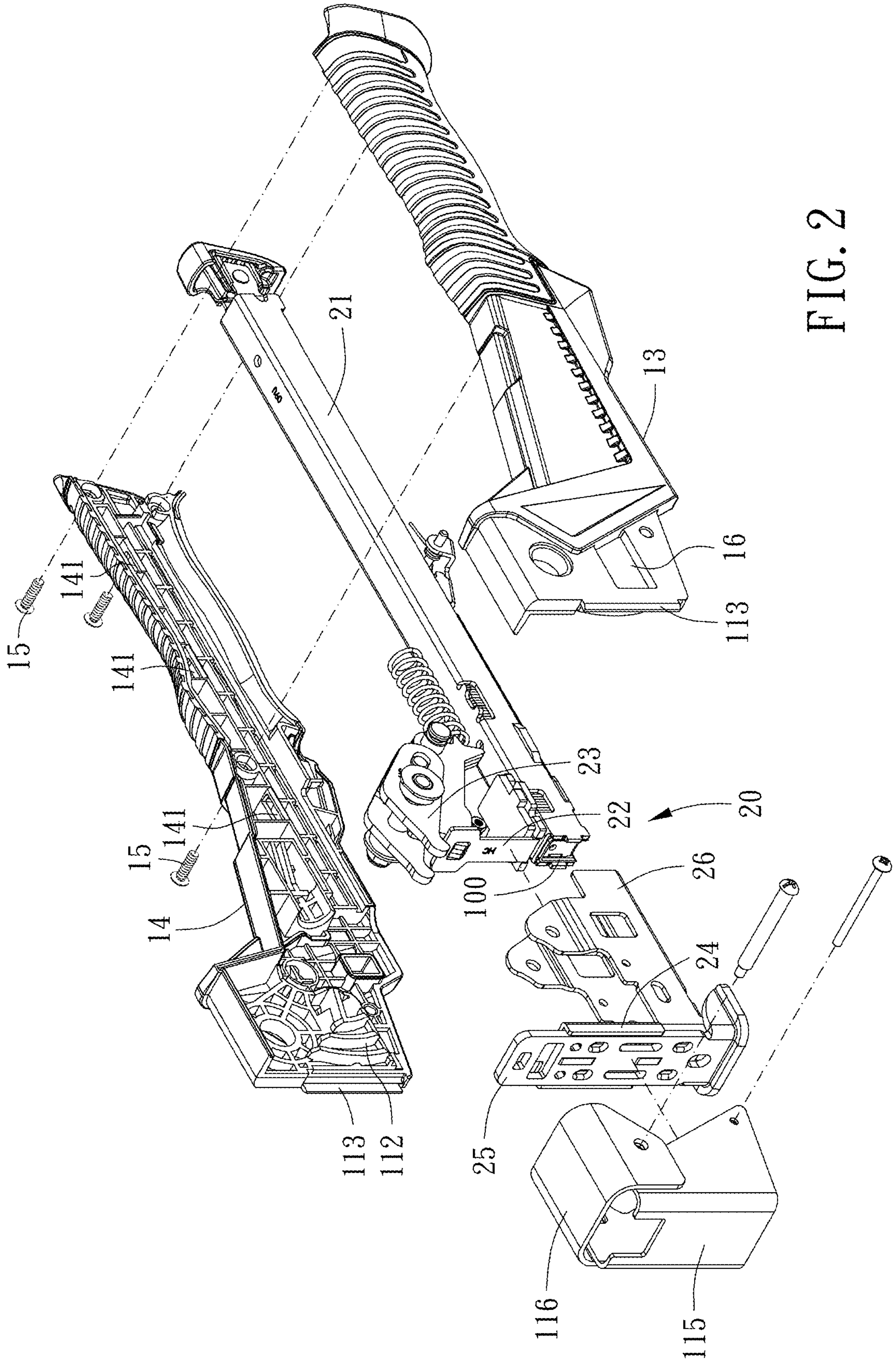
FIG. 2 is an exploded view of an exemplary embodiment of the hammer tacker of the present invention.
Figure 3:
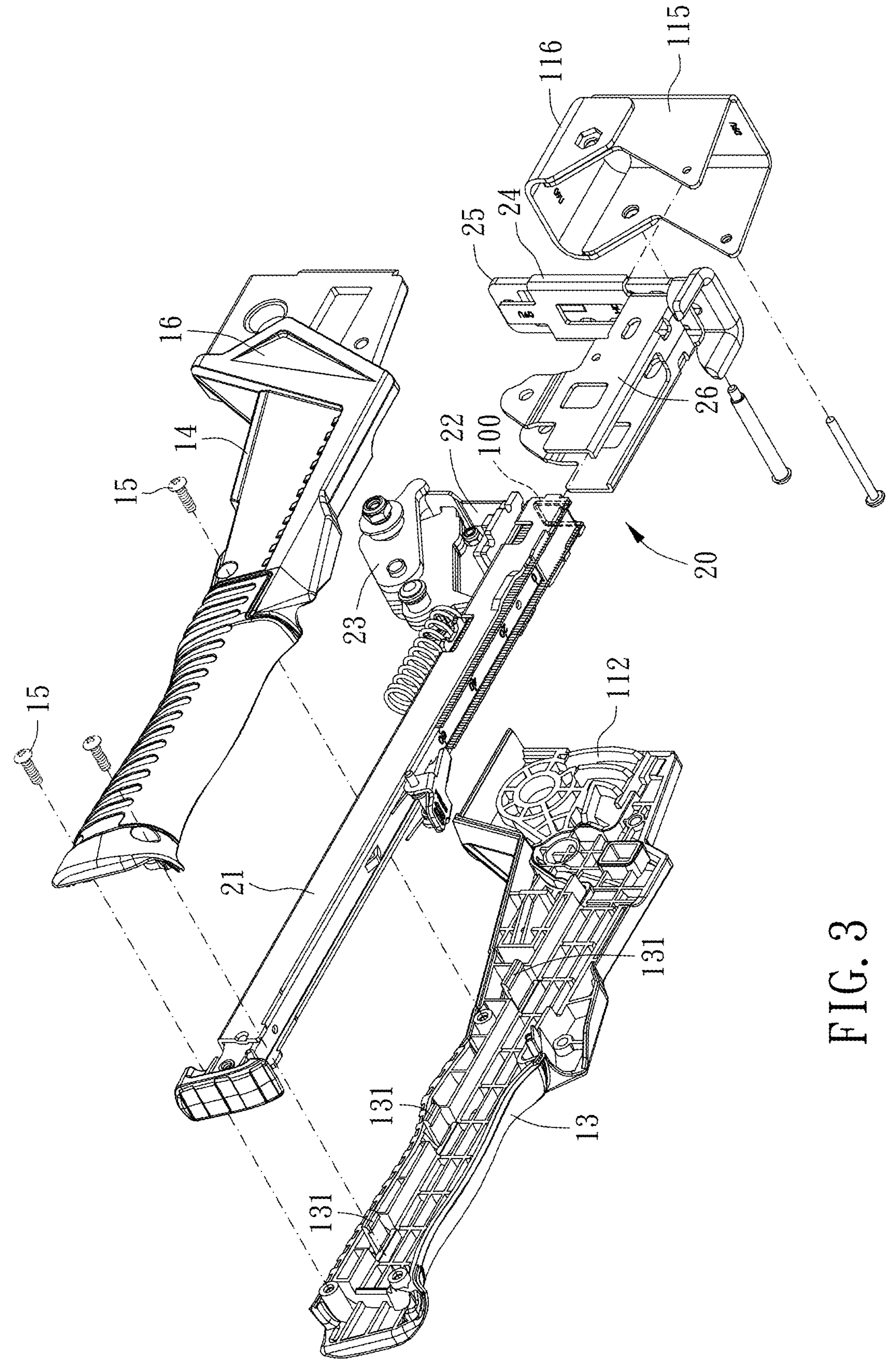
FIG. 3 is another exploded view of an exemplary embodiment of the hammer tacker of the present invention.
Figure 4:
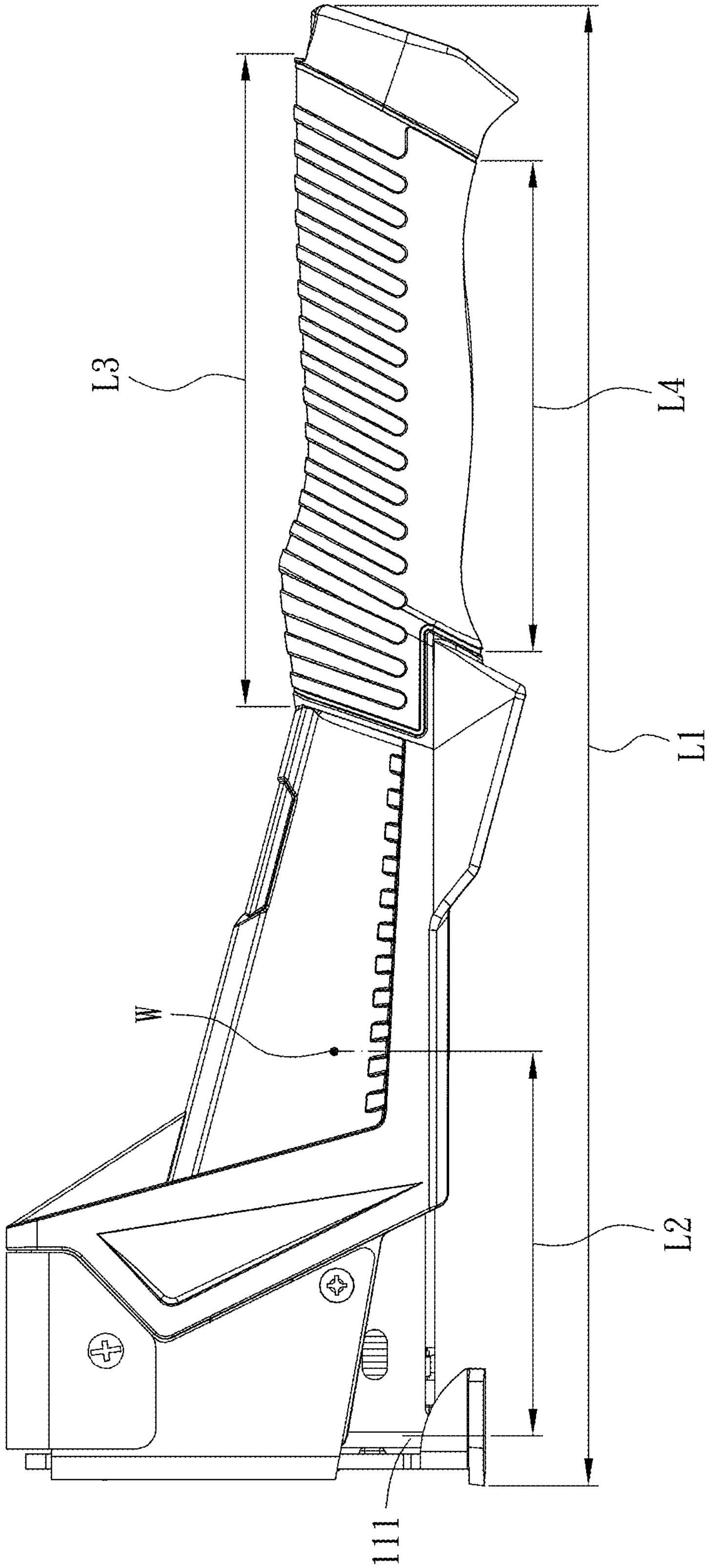
FIG. 4 is a side view of an exemplary embodiment of the hammer tacker of the present invention.
Figure 5:
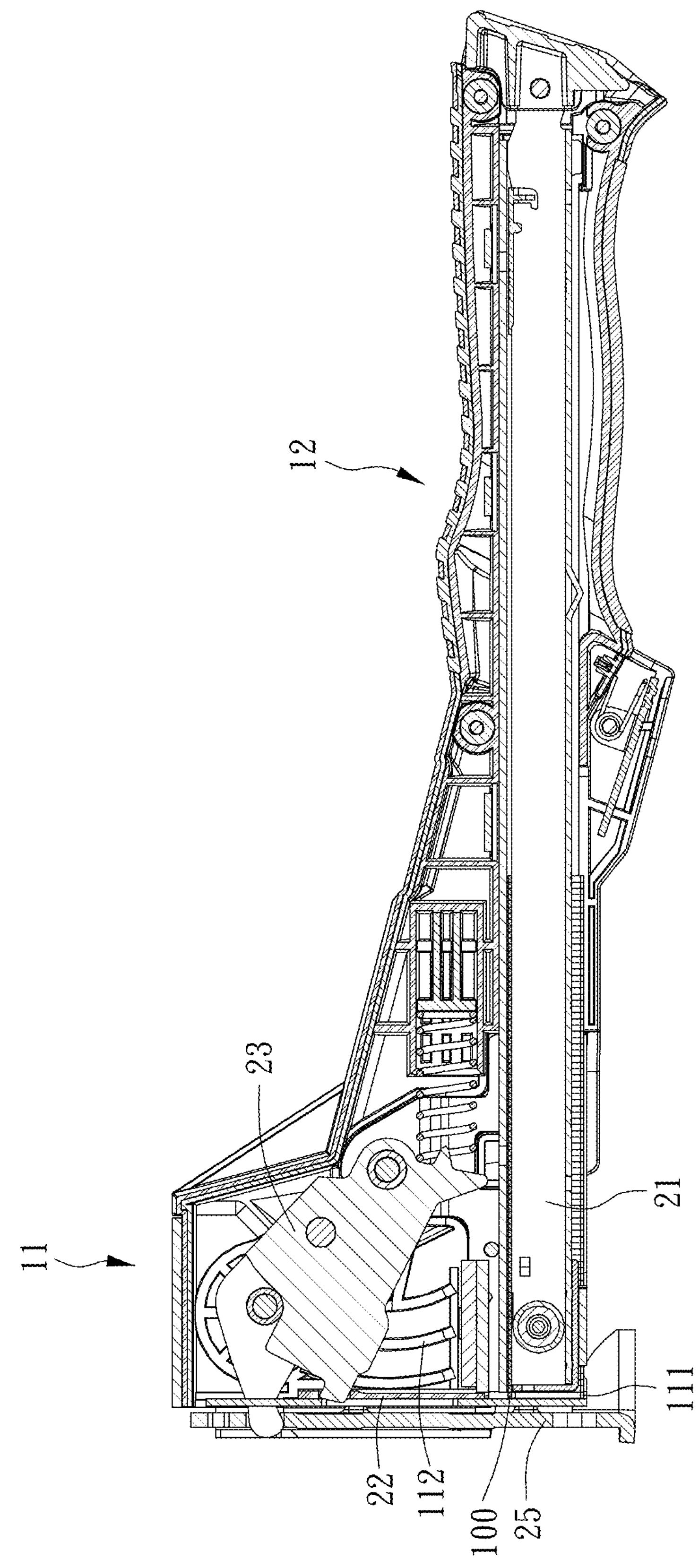
FIG. 5 is a cross-sectional view of an exemplary embodiment of the hammer tacker of the present invention.

Please refer to FIGS. 1 to 5 for an exemplary embodiment of the present invention. A hammer tacker 1 of the present invention includes a main body 10 and a striking mechanism 20.

The main body 10 includes a hammer head portion 11 and a handle portion 12 located at opposite ends. The hammer head portion 11 includes a nail outlet 111. The striking mechanism 20 is received within the hammer head portion 11 and includes a cartridge 21 and a striker 22. The cartridge 21 is movable toward the nail outlet 111 to strike a staple 100 out from the cartridge 21. The hammer tacker 1 includes both metal and non-metal parts. The main body 10 is a plastic shell, and the main body 10 has an overall length L1. A distance between the center of gravity W of the hammer tacker 1 and the nail outlet 111 in the longitudinal direction of the main body 10 is defined as a gravity center distance L2. A first ratio of the gravity center distance L2 to the overall length L1 ranges from 0.237 to 0.292. This allows for a comfortable, labor-saving, and balanced grip, while providing a good and efficient striking action.

The first ratio preferably ranges from 0.244 to 0.278. The gravity center distance L2 ranges from 72.0 mm to 82.0 mm. The handle portion 12 has a maximum length L3 and a minimum length L4. A second ratio of the maximum length L3 to the overall length L1 ranges from 0.418 to 0.461, and a third ratio of the minimum length L4 to the overall length L1 ranges from 0.305 to 0.348. For example, the overall length L1 is 295.0 mm, the gravity center distance L2 is 77.0 mm, the maximum length L3 of the handle portion 12 is 130.0 mm, and the minimum length L4 of the handle portion 12 is 97.0 mm. These dimensions may vary according to different user needs and/or component configurations.

In this embodiment, the main body 10 further includes a first shell member 13 and a second shell member 14. The first shell member 13 includes at least one hook 131, and the second shell member 14 includes at least one engaging slot 141. The at least one hook 131 is engaged within the at least one engaging slot 141, which allows for easy and quick assembly and disassembly. Preferably, the first shell member 13 and the second shell member 14 may be further secured with at least one fastener 15 (such as a screw) to provide a stable and reliable connection.

Preferably, the hammer head portion 11 further includes a plurality of guide ribs 112. The striking mechanism 20 further includes a swingable block 23 rotatably connected to the hammer head portion 11. The swingable block 23 is swingable between the plurality of guide ribs 112, and the swingable block 23 drives the striker 22 during swinging. This helps guide and maintain the swing of the swingable block 23, providing a stable, smooth, and efficient nail-driving effect. The hammer head portion 11 further includes a plurality of support boards 113 extending forwardly. The striking mechanism 20 further includes a guide track 24 and a trigger member 25. The guide track 24 is supported between the plurality of support boards 113, and the trigger member 25 is movably received within the guide track 24. The trigger member 25 is configured to trigger the release of the striker 22. The plurality of support boards 113 stabilize the guide track 24, making the triggering of the trigger member 25 more precise.

Specifically, the striking mechanism 20 further includes an attachment portion 26. The attachment portion 26 and the guide track 24 are integrally formed of one piece, and the attachment portion 26 is attached to the hammer head portion 11 and straddles the cartridge 21. The main body 10 further includes at least one counterweight slot 16 configured to receive at least one counterweight component. The hammer head portion 11 further includes at least one metal cover 114 which is detachable and covers the at least one counterweight slot 16. In this embodiment, the at least one metal cover 114 includes a first metal cover 115 and a second metal cover 116 arranged with partial overlap. The first metal cover 115 covers front, left and right sides of the hammer head portion 11, while the second metal cover 116 covers top, left and right sides of the hammer head portion 11, making it easy to install and adjust the counterweight as needed.

The metal part excludes the staple(s) 100. A fourth ratio of the weight of the metal part to the weight of the non-metal part ranges from 2.850 to 3.150. A fifth ratio of the total weight of the metal part and the staple(s) 100 to the weight of the non-metal part ranges from 3.030 to 3.138. The metal part includes, for example, the cartridge 21, the striker 22, the at least one fastener 15, the swingable block 23, the guide track 24, the attachment portion 26, the at least one metal cover 114, the pivot shaft, and the elastic members, etc. The staple(s) 100 may be a strip which includes 168 staples and weights 8.21 grams, a strip which includes 168 staples and weights 10.045 grams, a strip which includes 168 staples and weights 11.515 grams, or a strip which includes 168 staples and weights 13.36 grams. It is noted that the cartridge 21 may be configured to support one or more strips of staples.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A hammer tacker including:

a main body including a hammer head portion and a handle portion located at opposite ends, the hammer head portion including a nail outlet; and a striking mechanism received within the hammer head portion and including a cartridge and a striker, the striker being movable toward the nail outlet to strike a staple out from the cartridge;

wherein the hammer tacker further includes metal and non-metal parts, the main body is a plastic shell, the main body has an overall length, a distance between a center of gravity of the hammer tacker and the nail outlet in a longitudinal direction of the main body is defined as a gravity center distance, and a first ratio of the gravity center distance to the overall length ranges from 0.237 to 0.292.

2. The hammer tacker of claim 1, wherein the first ratio ranges from 0.244 to 0.278.

3. The hammer tacker of claim 1, wherein the handle portion has a maximum length and a minimum length, a second ratio of the maximum length to the overall length ranges from 0.418 to 0.461, and a third ratio of the minimum length to the overall length ranges from 0.305 to 0.348.

4. The hammer tacker of claim 1, wherein the metal part excludes the staple, and a ratio of a weight of the metal part to a weight of the non-metal part ranges from 2.850 to 3.150.

5. The hammer tacker of claim 1, wherein a ratio of a total weight of the metal part and the staple to a weight of the non-metal part ranges from 3.030 to 3.138.

6. The hammer tacker of claim 1, wherein the main body further includes a first shell member and a second shell member, the first shell member includes at least one hook, the second shell member includes at least one engaging slot, and the at least one hook is engaged within the at least one engaging slot.

7. The hammer tacker of claim 1, wherein the hammer head portion further includes a plurality of guide ribs, the striking mechanism further includes a swingable block rotatably connected to the hammer head portion, the swingable block is swingable between the plurality of guide ribs, and the swingable block drives the striker during swinging.

8. The hammer tacker of claim 1, wherein the hammer head portion further includes a plurality of support boards extending forwardly, the striking mechanism further includes a guide track and a trigger member, the guide track is supported between the plurality of support boards, the trigger member is movably received within the guide track, and the trigger member is configured to trigger release of the striker.

9. The hammer tacker of claim 8, wherein the striking mechanism further includes an attachment portion, the attachment portion and the guide track are integrally formed of one piece, and the attachment portion is attached to the hammer head portion and straddles on the cartridge.

10. The hammer tacker of claim 1, wherein the main body further includes at least one counterweight slot configured to receive at least one counterweight component, the hammer head portion further includes at least one metal cover which is detachable, and the at least one metal cover covers the at least one counterweight slot.

* * * * *